(12) United States Patent
Freeman et al.

(10) Patent No.: US 10,830,063 B2
(45) Date of Patent: Nov. 10, 2020

(54) TURBINE VANE ASSEMBLY WITH CERAMIC MATRIX COMPOSITE COMPONENTS

(71) Applicants: Rolls-Royce North American Technologies Inc., Indianapolis, IN (US); Rolls-Royce Corporation, Indianapolis, IN (US); Rolls-Royce plc, London (GB)

(72) Inventors: Ted J. Freeman, Danville, IN (US); Daniel K. Vetters, Indianapolis, IN (US); Christopher Nash, Indianapolis, IN (US); Eric Koenig, Fishers, IN (US); Michael Whittle, Derby (GB)

(73) Assignees: Rolls-Royce North American Technologies Inc., Indianapolis, IN (US); Rolls-Royce Corporation, Indianapolis, IN (US); Rolls-Royce plc, London ( * ) Notice: Subject to any disclaimer, the term of this patent is extended or adjusted under 35 U.S.C. 154(b) by 189 days.

(21) Appl. No.: 16/041,318

(22) Filed: Jul. 20, 2018

(65) Prior Publication Data
US 2020/0024972 A1    Jan. 23, 2020

(51) Int. Cl.
*F01D 5/28* (2006.01)
*F01D 5/30* (2006.01)
*F01D 5/20* (2006.01)
*F01D 11/08* (2006.01)

(52) U.S. Cl.
CPC .............. *F01D 5/284* (2013.01); *F01D 5/20* (2013.01); *F01D 5/3084* (2013.01); *F01D 11/08* (2013.01); *F05D 2220/32* (2013.01); *F05D 2240/55* (2013.01); *F05D 2300/6033* (2013.01)

(58) Field of Classification Search
CPC ........ F01D 11/005; F01D 11/02; F01D 9/042; F01D 5/284; F01D 11/08; F01D 5/20
USPC ...................................................... 415/170.1
See application file for complete search history.

(56) References Cited

U.S. PATENT DOCUMENTS

| | | |
|---|---|---|
| 5,078,576 A | 1/1992 | Hayton |
| 5,149,250 A | 9/1992 | Plemmons et al. |
| 5,616,001 A | 4/1997 | Boyd |
| 5,833,244 A | 11/1998 | Salt et al. |
| 6,325,593 B1 | 12/2001 | Darkins, Jr. et al. |
| 6,398,488 B1 | 6/2002 | Solda et al. |
| 6,514,046 B1 | 2/2003 | Morrison et al. |
| 6,558,114 B1 | 5/2003 | Tapley et al. |
| 6,648,597 B1 | 11/2003 | Widrig et al. |
| 6,682,299 B2 | 1/2004 | Bowen et al. |
| 7,371,004 B1 | 5/2008 | Nereim |
| 7,762,766 B2 | 7/2010 | Shteyman et al. |

(Continued)

FOREIGN PATENT DOCUMENTS

| | | |
|---|---|---|
| WO | 2014105270 A2 | 7/2014 |
| WO | 2014200831 A1 | 12/2014 |

OTHER PUBLICATIONS

Extended European Search Report, European Application No. 19187172.2-1006, dated Nov. 14, 2019, 12 pages.

*Primary Examiner* — J. Todd Newton
(74) *Attorney, Agent, or Firm* — Barnes & Thornburg LLP

(57) ABSTRACT

Structural rod supports are provided in vanes in a gas turbine assembly in order to provide support to the vanes and an annular seal. Structural rods couple to the turbine case at one end and the annular seal at an opposite end.

20 Claims, 3 Drawing Sheets

(56) References Cited

U.S. PATENT DOCUMENTS

| | | | |
|---|---|---|---|
| 8,382,432 B2* | 2/2013 | Grissino | F16J 15/44 |
| | | | 415/115 |
| 8,454,303 B2 | 6/2013 | Garcia-Crespo | |
| 8,740,554 B2 | 6/2014 | Virklet et al. | |
| 9,097,141 B2* | 8/2015 | Paradis | F01D 25/243 |
| 9,353,643 B2* | 5/2016 | Major | F01D 17/162 |
| 9,540,940 B2 | 1/2017 | Liotta et al. | |
| 9,546,557 B2 | 1/2017 | Grooms, III et al. | |
| 9,719,363 B2 | 8/2017 | Pack et al. | |
| 9,915,159 B2 | 3/2018 | Huizenga et al. | |
| 9,970,317 B2* | 5/2018 | Freeman | F01D 25/005 |
| 10,094,239 B2* | 10/2018 | Freeman | F01D 25/005 |
| 10,174,627 B2 | 1/2019 | Chang et al. | |
| 2014/0001285 A1 | 1/2014 | Grooms, III et al. | |
| 2014/0255174 A1 | 9/2014 | Duelm et al. | |
| 2016/0003072 A1 | 1/2016 | Chang et al. | |
| 2016/0123165 A1* | 5/2016 | McCaffrey | F01D 9/02 |
| | | | 415/1 |
| 2016/0177761 A1* | 6/2016 | Huizenga | F01D 9/047 |
| | | | 415/209.3 |
| 2016/0201488 A1 | 7/2016 | Carr et al. | |
| 2017/0022833 A1 | 1/2017 | Heitman et al. | |
| 2017/0051619 A1 | 2/2017 | Tuertscher | |
| 2017/0101880 A1 | 4/2017 | Thomas et al. | |
| 2018/0045117 A1 | 2/2018 | Groves, II et al. | |
| 2018/0223680 A1 | 8/2018 | Hafner | |
| 2018/0328187 A1 | 11/2018 | Oke | |
| 2018/0340431 A1 | 11/2018 | Kerns et al. | |
| 2018/0370158 A1 | 12/2018 | Gallier et al. | |

\* cited by examiner

TURBINE VANE ASSEMBLY WITH CERAMIC MATRIX COMPOSITE COMPONENTS

FIELD OF THE DISCLOSURE

The present disclosure relates generally to vanes used in gas turbine engines, and more specifically to structural rods positioned within one or more vanes to support an annular seal panel.

BACKGROUND

Engines, and particularly gas turbine engines, are used to power aircraft, watercraft, power generators and the like. Gas turbine engines typically include a compressor, a combustor, and a turbine. The compressor compresses air drawn into the engine and delivers high-pressure air to the combustor. The combustor is a component or area of a gas turbine engine where combustion takes place. In a gas turbine engine, the combustor receives high-pressure air and adds fuel to the air, which is burned to produce hot, high-pressure gas. After burning the fuel, the hot, high-pressure gas is passed from the combustor to the turbine. The turbine extracts work from the hot, high-pressure gas to drive the compressor and residual energy is used for propulsion or sometimes to drive an output shaft.

Turbines typically include static airfoils, or vanes that cooperate with an annular seal plate, to regulate the flow of air and the relative pressures between turbines located forward and aft these static airfoils. These vanes can be made of ceramic matrix composite (CMC) materials to reduce the cooling air usage, increase turbine entry temperatures, reduce weight and increase turbine efficiency when compared to vanes of other materials. When these vanes are coupled to the seal plate, loads (typically bending loads) incurred by the seal plate are transferred to the CMC vane. CMC components often have lower material strength than similar metallic components. Accordingly, new techniques and configurations are needed to tailor the distribution of loads from seal plate mounting.

SUMMARY

The present disclosure may comprise one or more of the following features and combinations thereof.

A turbine section for a gas turbine engine can include a turbine case that extends around a central axis and a turbine vane assembly coupled to the turbine case. The turbine vane assembly includes a plurality of airfoils made from ceramic matrix composite materials that extend across a primary gas path of the turbine section and a plurality of spars made of metallic materials that extend radially through corresponding airfoils to support the corresponding airfoils relative to the turbine case. an annular seal panel mounted to extend radially inward of the turbine vane assembly and configured to resist the movement of gasses along the central axis without interacting with the airfoil of the turbine vane assembly, The turbine section further has a panel-support assembly that extends from the turbine case to the seal panel to fix the seal panel in place relative to the turbine case. The panel-support assembly including a plurality of structural rods that each extend radially through a corresponding airfoil such that each structural rod is shielded by the corresponding airfoil from hot gasses moving through the primary gas path of the turbine section.

In some embodiments, each of the plurality of structural rods includes a shaft that extends through the airfoil and a retainer arranged radially inward of the airfoil and the retainer is sized to block movement of the shaft out of the airfoil via radially outward motion of the corresponding structural rod. Each of the plurality of structural rods includes a mount flange arranged radially inward of the airfoil of the turbine vane and the annular seal panel is coupled to the mount flange. The shaft of the panel-support assembly has threads at a radially outer end and the panel-support assembly includes nuts that engage the threads.

In some embodiments, the spar of the turbine vane assembly defines a radially-extending passageway and the structural rods of the panel-support assembly each extend through a corresponding radially-extending passageway defined by a spar.

In some embodiments, the annular seal panel includes a hub and a seal land that provides a sealing surface configured to be engaged by a rotating component to form a seal during operation of the gas turbine engine. A turbine rotor is mounted for rotation about the central axis.

The turbine rotor includes a forward turbine wheel arranged axially forward of the turbine vane assembly along the central axis, an aft turbine wheel assembly arranged axially aft of the turbine vane assembly along the central axis, and a seal located therebetween that engages the seal land of the annular seal panel to provide a seal during operation of the gas turbine engine. The seal includes a number of knife rings that engage the seal land of the annular seal panel.

According to another embodiment, a turbine section for a gas turbine engine includes a turbine case that extends around a central axis and a turbine vane assembly coupled to the turbine case. The turbine vane assembly including at least one airfoil made from ceramic matrix composite material that extends across a primary gas path of the turbine section, An annular seal panel is mounted to extend radially inward of the turbine vane assembly and configured to resist the movement of gasses along the central axis without interacting with the airfoil of the turbine vane assembly. Additionally, a panel-support assembly extends from the turbine case to the seal panel to fix the seal panel in place relative to the turbine case. The panel-support assembly including at least one structural rod that extends radially through a corresponding airfoil such that the at least one structural rod is shielded by the corresponding airfoil from hot gasses moving through the primary gas path of the turbine section.

In some embodiments, the turbine vane assembly comprises a plurality of airfoils and airfoils adjacent to the at least one airfoil are devoid of structural rods. The panel-support assembly comprises a plurality of structural rods radially spaced apart around the turbine case so that the structural rods extend through every second, third, or every fourth airfoil of the plurality of airfoils.

In some embodiments, the panel-support assembly further includes a nut extending through an opening in the turbine casing and into a threaded opening in the interior of the structural rod, and the radial position of the seal panel relative to the turbine case may be changed by rotating the nut along the threaded opening. The distal end of the structural rod includes a mount flange arranged radially inward of the airfoil of the turbine vane and the annular seal panel is coupled to the mount flange. The mount flange can be a t-shaped flange configured to be received in a keyed opening in the seal panel or the mount flange and the seal panel are coupled together via one of a bolt, pin, cam-lock braze or weld.

In some embodiments, the turbine vane assembly further comprises a spar extending through the airfoil and surrounding the structural rod.

In some embodiments, the structural rod is formed to include a plurality of impingement holes for moving cooling air into the airfoil. The annular seal panel includes a hub and a seal land that provides a sealing surface configured to be engaged by a rotating component to form a seal during operation of the gas turbine engine.

In some embodiments, a turbine rotor is mounted for rotation about the central axis, the turbine rotor including a forward turbine wheel arranged axially forward of the turbine vane assembly along the central axis and an aft turbine wheel assembly arranged axially aft of the turbine vane assembly along the central axis. A seal rotor engages the seal land of the annular seal panel to provide a seal during operation of the gas turbine engine. The shaft of the panel-support assembly has threads at a radially outer end and the panel-support assembly includes a nut that engages the threads.

These and other features of the present disclosure will become more apparent from the following description of the illustrative embodiments.

DETAILED DESCRIPTION

Figure 1:
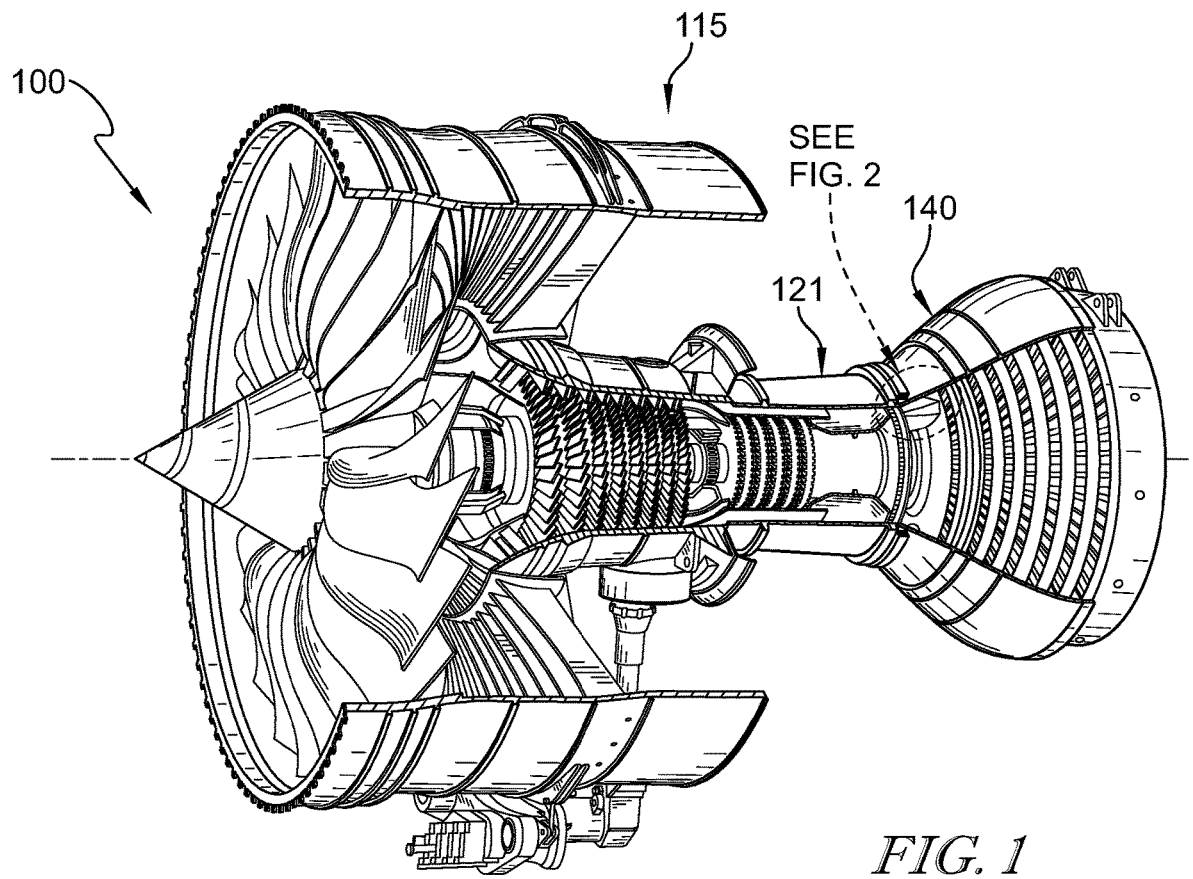
FIG. 1 is a perspective cut-away view of a turbine engine showing that the engine includes a turbine arranged aft of a compressor, and a combustor to receive hot, high pressure air produced in the compressor and combustor.

For the purposes of promoting an understanding of the principles of the disclosure, reference will now be made to a number of illustrative embodiments illustrated in the drawings and specific language will be used to describe the same.

The arrangement of an illustrative vane 10 in a gas turbine engine 100 is shown in FIG. 1. The gas turbine engine 100 includes a compressor 115, a combustor 121, and a turbine 140 housing a plurality of vanes 10 that form a vane assembly. An output shaft is driven by the turbine 140 and may drive a propeller, a gearbox, a pump, or fan depending on the application of the gas turbine engine 100.

Each of the vanes 10 is located in the turbine and can be secured via a seal panel mount assembly 22 and/or a spar to a turbine case 20. A turbine rotor 48, includes a shaft 52, a forward turbine wheel 50 and aft turbine wheel 56, located forward and aft, respectively of the vane 10. Turbine rotor 48 further includes a rotating component 54, that moves with the rotation of the shaft 52 and is positioned radially interior to, and directly under the vane 10.

A vane assembly 28 can include one or more vanes 10, made of ceramic matrix composite (CMC) material, that each has an outer endwall 32, an inner endwall 40 and an airfoil 36 extending therebetween. In some embodiments, vane assembly 28 includes a metal spar 330b extending through the interior of the airfoil 26 from the outer endwall 32 to the inner endwall 40. Spar 330b includes a flanged head 360b to couple to a blade carrier 331 coupled to the turbine case 20 as further disclosed with respect to FIG. 3.

Figure 2:
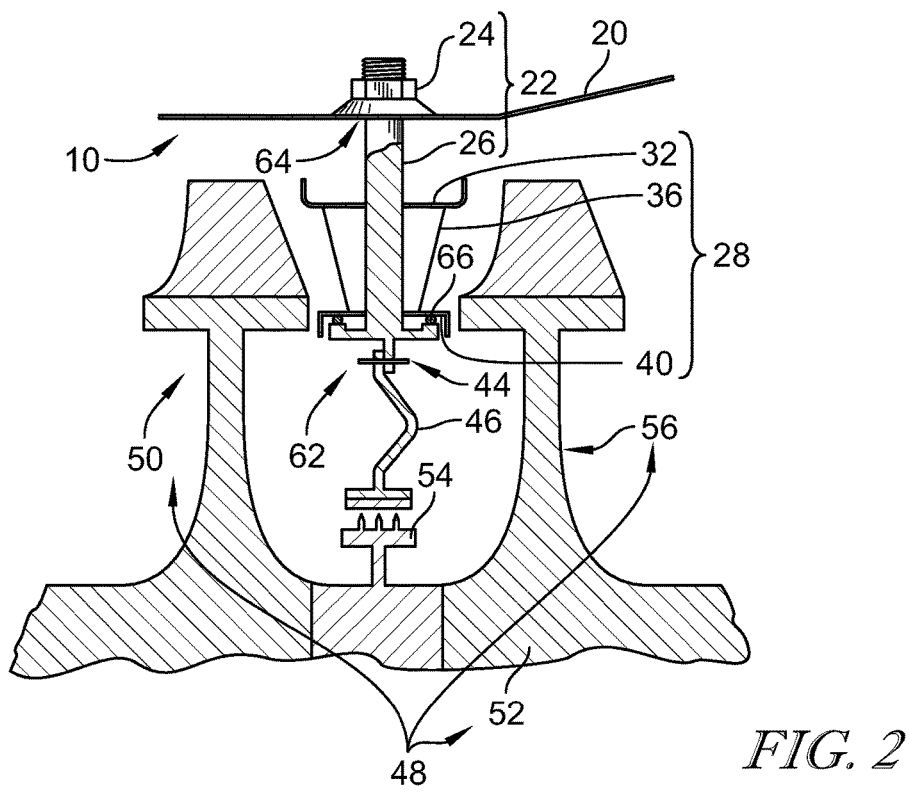
FIG. 2 is a sectional view of a portion of the turbine of FIG. 1 showing an vane and seal plate coupled to a case via a seal panel mount assembly with a structural rod that extends through the vane to support the seal panel relative to the case.

Seal panel-support assembly 22 includes at least structural rod 26 and a retainer such as a nut 24. Structural rod (STROD) 26 can be made of metal, and extends from the turbine case 20 through the vane assembly 28 inside of each of the airfoil 36 and the optional spar 330b, and terminates at a terminal end 62. Seal panel-support assembly 22 can include a plurality of structural rods 26 and retainers spaced equidistantly about the turbine case 20. Structural rod 26 can be formed of a metallic material and is shielded within the airfoil 36 from hot gasses moving through a primary gas path of the turbine section of the engine. As illustrated in FIG. 2, Structural rod 26 extends through an opening 64 formed in the turbine case 20 and a nut 24 or other screw-type fitting is threaded onto an end of the STROD 26 thereby allowing radial adjustment of the position of the STROD 26.

Structural rod terminal end 62 can be formed to include an inner platform retainer structure that is coupled to the inner endwall 42 of the vane assembly 28 via a seal 66. Structural rod terminal end 62 is also coupled to an annular seal panel 46 to fix the radial position of the seal panel in place relative to the turbine case 20. Seal panel 46 acts as a divider plate between the forward and aft turbine wheels 50, 56 to resist the movement of gasses along a central axis of the turbine and minimizes leakage between an aft angel wing of a the vane and the forward angel wing of a blade. Annular seal panel 46 extends between the terminal end 62 of the structural rod and the aligned seal rotor 54. In some embodiments, in lieu of seal rotor 54, seal may part of forward or aft disk, or could be incorporated into a coverplate mounted to the forward or aft disk. In some embodiments the structural rod terminal end, or mount flange 62 is coupled to the annular seal panel 46 via a securing pin, bolt, braze, or weld joint 44. In this manner, the relative radial adjustment of the position of the STROD 26 corresponds to radial adjustment a contact, or clearance space between knife rings 55 of the seal rotor 54 and the a distal seal land 47 of the seal panel 46 thereby allowing the space to be tuned to adjust the thrust balance. Additionally nut 24 or other screw-type fitting can radially adjust the position of the STROD 26 and corresponding seal panel and airfoil to place tension on the structural rod. Further, loads experienced in the seal panel 46 are transferred through the STROD and out to the turbine case 20, thereby avoiding exerting bending loads on the vane 10.

Figure 3:
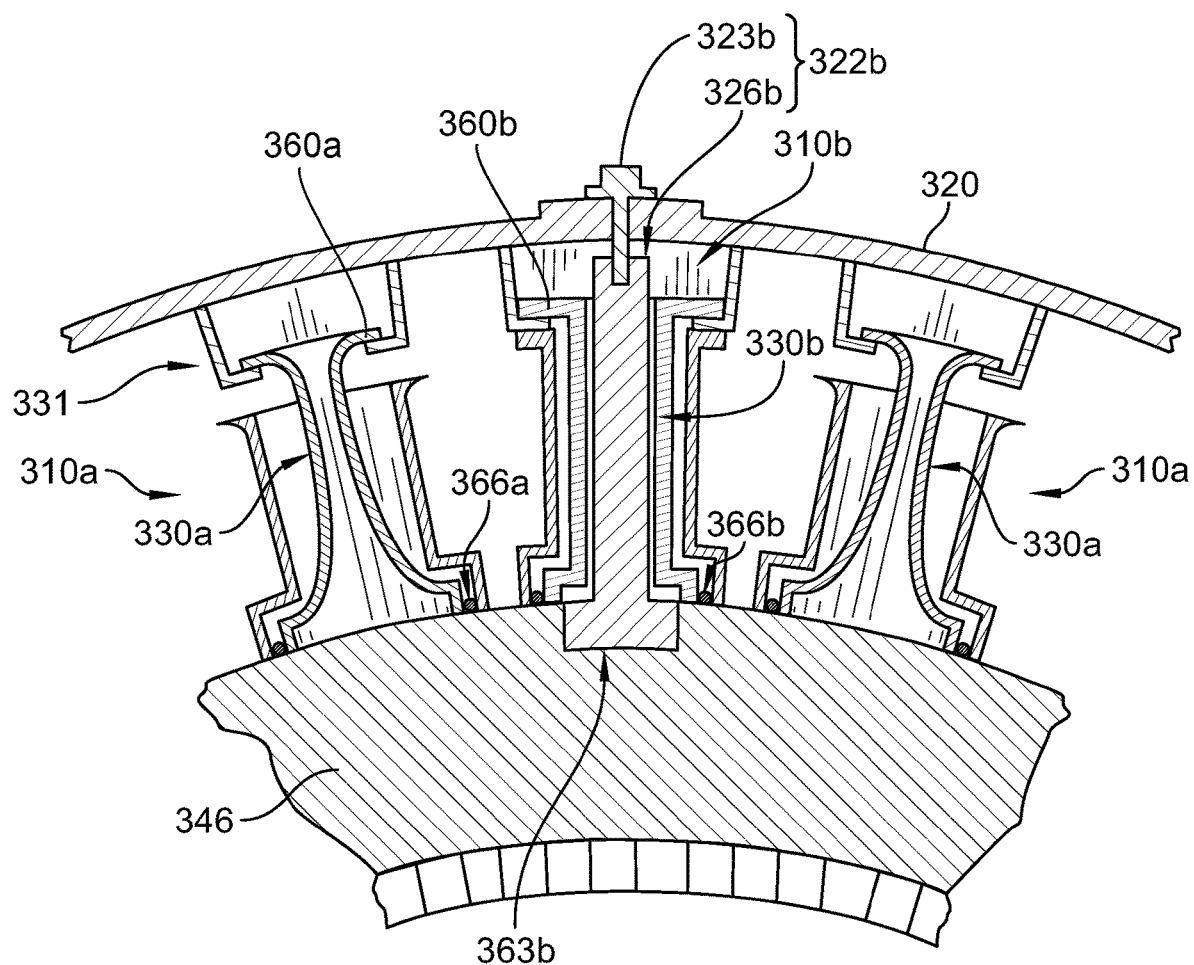
FIG. 3 is a cross-sectional view of the turbine depicting a vane assembly embodiment along a segment of an annular seal panel supported by a structural rod extending through the vane.

Another illustrative vane assembly 328 includes vanes 310a,b adapted for use in a gas turbine engine are shown in FIG. 3. As seen in FIG. 3, the vanes 310a, b is substantially the same as seen in FIG. 2. Accordingly, similar reference numbers in the 300 series not discussed herein indicate features that are common between vane 10 and vanes 310a, b. The description of the vane 10 is hereby incorporated by reference to apply to the vanes 310a,b except in instances where it conflicts with the specific description and drawings of vane 310a,b.

As is depicted, vanes 310*a,b* each include an airfoil and a spar 330*a, b* extending there through. Each spar 330*a, b* couples via a flanged end 360*a,b* to the turbine case 320 via a carrier 331*a,b* that receives the ends of the respective spars. Seals 366*a,b* are arranged between the seal panel 346 and the opposite endwalls of the spars and vanes, but may be sealed in other known configurations as well. In this embodiment the vanes 310*a* is supported by the spar 330*a* and does not include a structural rod. Alternatively, spar 330*b* could be coupled to the strod instead of the carrier.

In this embodiment, vane 310*b* has a structural rod 326*b*, which extends through the vane 310*b* and the structural rod 330*b* has a t-shaped terminal end 363*b* that is coupled to a keyed opening in the seal panel 346. Seal panel 346 is keyed as a hub to receive the t-shaped terminal end 363*b* and couple to the structural rod upon rotation of the t-shaped terminal 363*b* end by 90 degrees in a cam-lock configuration. In this embodiment, seal panel-support assembly 322*b* includes a bolt or other threaded fastener 323*b* configured to extend through case 320 into and mate with a threaded interior of the STROD 326*b*. Although vane 310*b* is shown with a similar seal 366*b* configuration as vanes 310*a*, it may alternatively include a terminal end platform and seal configuration as seen in FIG. 2. Furthermore, vane 310*b* may alternatively be assembled with structural rod 326*b* and without spar 330*b*.

As seen in FIG. 3, STRODs are not located in each consecutive airfoil. In a preferred embodiment, STRODSs are placed in every third or fourth airfoil along a seal panel and equally spaced around the annular seal panel 346 to equally distribute the forces exerted on the seal plate 346 to the turbine case 320. In illustrated embodiments, STRODs are placed in at least three locations to allow for location adjustment of the seal panel 346 relative to the central axis of the engine or other components.

Figure 4:
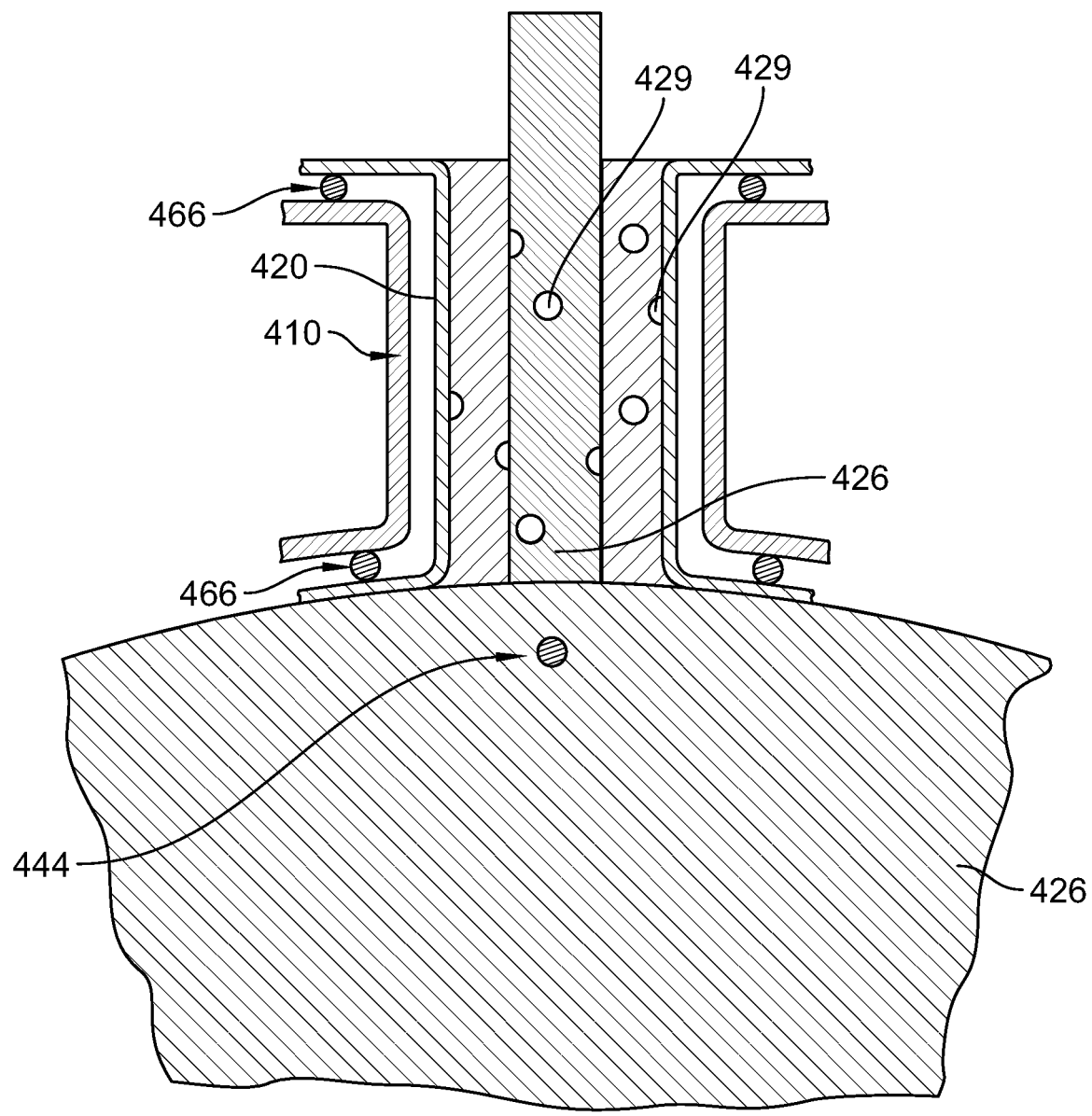
FIG. 4 shows a vane according to the embodiments of FIGS. 1-3 in which a structural rod and a spar include impingement holes.

Another illustrative vane assembly 428 includes vanes 410 adapted for use in a gas turbine engine are shown in FIG. 4. As seen in FIG. 4, the vanes 10 is substantially the same as seen in FIGS. 2-3. Accordingly, similar reference numbers in the 400 series not discussed herein indicate features that are common between vane 10 and vanes 410. The description of the vane 10 is hereby incorporated by reference to apply to the vanes 410 except in instances where it conflicts with the specific description and drawings of vane 410.

An alternative STROD embodiment is depicted in FIG. 4 in which a vane 410 includes a spar 430 extending there through and a STROD 426 extending through the spar as previously described with respect to FIGS. 2-3. In this embodiment, each of the spar 420 and the STROD 426 includes a plurality of impingement holes 429 for directing cooling airflow within the vane 410. However, one or both of STROD and spar in FIGS. 1-3 may include impingement holes. As seen in this embodiment, the STROD 426 is secured to a mount location of annular seal panel 446 via a pin 444 although other disclosed securing mechanisms can be used.

When vanes are coupled to a seal plate in other designs, loads (typically bending loads) incurred by the seal plate are transferred to the CMC vane. CMC components often have lower material strength than similar metallic components. Accordingly, new techniques and configurations are provided by designs herein to tailor the positional mounting of a vane and a corresponding seal panel in a turbine engine to control forces experienced by the vane and tailor the thrust generated between forward and aft turbines.

In order to transfer these loads away from the CMC vane, structural rods may be inserted through the turbine case, and vane, and couple to the seal plate. In this manner, loads applied to the seal plate are transferred via the structural rod to the turbine case thereby maintaining the integrity of the CMC vane. Further, by inserting structural rods, the radial position of the seal plate relative to a rotating seal element of the turbine may be tuned to a particular radial position thereby controlling thrust.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section for a gas turbine engine, the turbine section comprising
a turbine case that extends around a central axis,
a turbine vane assembly coupled to the turbine case, the turbine vane assembly including a plurality of airfoils made from ceramic matrix composite materials that extend across a primary gas path of the turbine section and a plurality of spars made of metallic materials that extend radially through corresponding airfoils to support the corresponding airfoils relative to the turbine case,
an annular seal panel mounted to extend radially inward of the turbine vane assembly and configured to resist the movement of gasses along the central axis without interacting with the airfoil of the turbine vane assembly, and
a panel-support assembly that extends from the turbine case to the seal panel to fix the seal panel in place relative to the turbine case, the panel-support assembly including a plurality of structural rods that each extend radially through a corresponding airfoil such that each structural rod is shielded by the corresponding airfoil from hot gasses moving through the primary gas path of the turbine section,
wherein each of the plurality of spars of the turbine vane assembly define a radially-extending passageway and each of the plurality of structural rods of the panel-support assembly extend through a corresponding radially-extending passageway, spaced apart from an interior surface of the corresponding spar, to transfer loads from the plurality of structural rods to the turbine case thereby avoiding bending loads from being exerted from the seal panel onto the plurality of airfoils.

2. The turbine section of claim 1, wherein each of the plurality of structural rods includes a shaft that extends through the airfoil and a retainer arranged radially inward of the airfoil, the retainer being sized to block movement of the shaft out of the airfoil via radially outward motion of the corresponding structural rod.

3. The turbine section of claim 2, wherein each of the plurality of structural rods includes a mount flange arranged radially inward of the airfoil of the turbine vane and the annular seal panel is coupled to the mount flange.

4. The turbine section of claim 2, wherein the shaft of the panel-support assembly has threads at a radially outer end and the panel-support assembly includes nuts that engage the threads.

5. The turbine section of claim 1, wherein the annular seal panel includes a hub and a seal land that provides a sealing surface configured to be engaged by a rotating component to form a seal during operation of the gas turbine engine.

6. The turbine section of claim 5, further comprising a turbine rotor mounted for rotation about the central axis, the turbine rotor including a forward turbine wheel arranged axially forward of the turbine vane assembly along the central axis, an aft turbine wheel assembly arranged axially aft of the turbine vane assembly along the central axis, and a seal located therebetween that engages the seal land of the annular seal panel to provide a seal during operation of the gas turbine engine.

7. The turbine section of claim 6, wherein the seal includes a number of knife rings that engage the seal land of the annular seal panel.

8. The turbine section of claim 1, wherein a second airfoil adjacent to the at least one of the plurality of airfoils is devoid of the plurality of structural rods.

9. The turbine section of claim 1, wherein the plurality of structural rods are formed to include a plurality of impingement holes for moving cooling air into the plurality of airfoils.

10. A turbine section for a gas turbine engine, the turbine section comprising:
    a turbine case that extends around a central axis,
    a turbine vane assembly coupled to the turbine case, the turbine vane assembly including at least one airfoil made from ceramic matrix composite material that extends across a primary gas path of the turbine section,
    an annular seal panel mounted to extend radially inward of the turbine vane assembly and configured to resist the movement of gasses along the central axis without interacting with the airfoil of the turbine vane assembly, and
    a panel-support assembly that extends from the turbine case to the seal panel to fix the seal panel in place relative to the turbine case, the panel-support assembly including at least one structural rod that extends radially through the at least one airfoil such that the at least one structural rod is shielded by the at least one airfoil from hot gasses moving through the primary gas path of the turbine section,
    wherein the turbine vane assembly comprises a plurality of airfoils and a second airfoil adjacent to the at least one airfoil is devoid of structural rods.

11. The turbine section of claim 10, wherein the panel-support assembly comprises a plurality of structural rods radially spaced apart around the turbine case so that the structural rods extend through every second, third, or every fourth airfoil of the plurality of airfoils.

12. The turbine section of claim 10, wherein the panel-support assembly further includes a nut extending through an opening in the turbine casing and into a threaded opening in the interior of the structural rod, and the radial position of the seal panel relative to the turbine case may be changed by rotating the nut along the threaded opening.

13. The turbine section of claim 10, wherein the distal end of the structural rod includes a mount flange arranged radially inward of the airfoil of the turbine vane and the annular seal panel is coupled to the mount flange.

14. The turbine section of claim 13, wherein the mount flange is a t-shaped flange configured to be received in a keyed opening in the seal panel.

15. The turbine section of claim 13, wherein the mount flange and the seal panel are coupled together via one of a bolt, pin, cam-lock, braze or weld.

16. The turbine section of claim 10, wherein the turbine vane assembly further comprises a spar extending through the airfoil and surrounding the structural rod.

17. The turbine section of claim 10, wherein the annular seal panel includes a hub and a seal land that provides a sealing surface configured to be engaged by a rotating component to form a seal during operation of the gas turbine engine.

18. The turbine section of claim 17, further comprising a turbine rotor mounted for rotation about the central axis, the turbine rotor including a forward turbine wheel arranged axially forward of the turbine vane assembly along the central axis, an aft turbine wheel assembly arranged axially aft of the turbine vane assembly along the central axis, and a seal rotor that engages the seal land of the annular seal panel to provide a seal during operation of the gas turbine engine.

19. The turbine section of claim 18, wherein the shaft of the panel-support assembly has threads at a radially outer end and the panel-support assembly includes a nut that engages the threads.

20. A turbine section for a gas turbine engine, the turbine section comprising:
    a turbine case that extends around a central axis,
    a turbine vane assembly coupled to the turbine case, the turbine vane assembly including at least one airfoil made from ceramic matrix composite material that extends across a primary gas path of the turbine section,
    an annular seal panel mounted to extend radially inward of the turbine vane assembly and configured to resist the movement of gasses along the central axis without interacting with the airfoil of the turbine vane assembly, and
    a panel-support assembly that extends from the turbine case to the seal panel to fix the seal panel in place relative to the turbine case, the panel-support assembly including at least one structural rod that extends radially through the at least one airfoil such that the at least one structural rod is shielded by the at least one airfoil from hot gasses moving through the primary gas path of the turbine section,
    wherein the structural rod is formed to include a plurality of impingement holes for moving cooling air into the airfoil.

* * * * *